United States Patent [19]

Meunier

[11] Patent Number: 5,264,936
[45] Date of Patent: Nov. 23, 1993

[54] SYSTEM FOR ADJUSTING FILTERS PROCESSING THE COMPOSITE VIDEO SIGNAL IN A SECAM MULTISTANDARD SET

[75] Inventor: Thierry Meunier, Voreppe, France

[73] Assignee: SGS-Thomson Microelectronics S.A., Gentilly, France

[21] Appl. No.: 748,201

[22] Filed: Aug. 21, 1991

[30] Foreign Application Priority Data

Aug. 22, 1990 [FR] France ............................. 90 10742

[51] Int. Cl.⁵ ............................................. H04N 5/46
[52] U.S. Cl. ....................................... 358/188; 358/38; 358/904
[58] Field of Search ................. 358/188, 21 R, 181, 358/195.1, 38, 904

[56] References Cited

U.S. PATENT DOCUMENTS 4,476,491 10/1984 Murata et al. ..................... 358/905
5,032,916 7/1991 Matsura et al. ................... 358/905

FOREIGN PATENT DOCUMENTS 0314873 5/1989 European Pat. Off. .
2537817 12/1982 France .
0265868 11/1987 Japan ................................. 358/905

OTHER PUBLICATIONS

Elektor Electronics, "Single-Chip Multi-Standard Colour Decoder", No. 156, May 1988, pp. 57-59.
IEEE Transactions on Consumer Electronics, "Cost Effective Hi-Performance Color Television", No. 4, Nov. 1987, CE-33, pp. 499-506.
IEEE Transactions on Consumer Electronics, "A Fully Automatic Multistandard TV Chrominance Decoder", CE-31, No. 3, Aug. 1985, pp. 147-155.

Primary Examiner—James J. Groody
Assistant Examiner—David E. Harvey
Attorney, Agent, or Firm—Lowe, Price, LeBlanc & Becker

[57] ABSTRACT

A system for adjusting filters processing the composite video signal in a multistandard set by determining the tuning phases during the quiescent phases of the composite video signal. A reference signal ($f_{ref}$) is applied to the filter during the tuning phases; a phase-locked loop supplies an error signal corresponding to the phase-shift of the filter; and means (14) are provided for storing the error signal of the phase-locked loop.

15 Claims, 1 Drawing Sheet

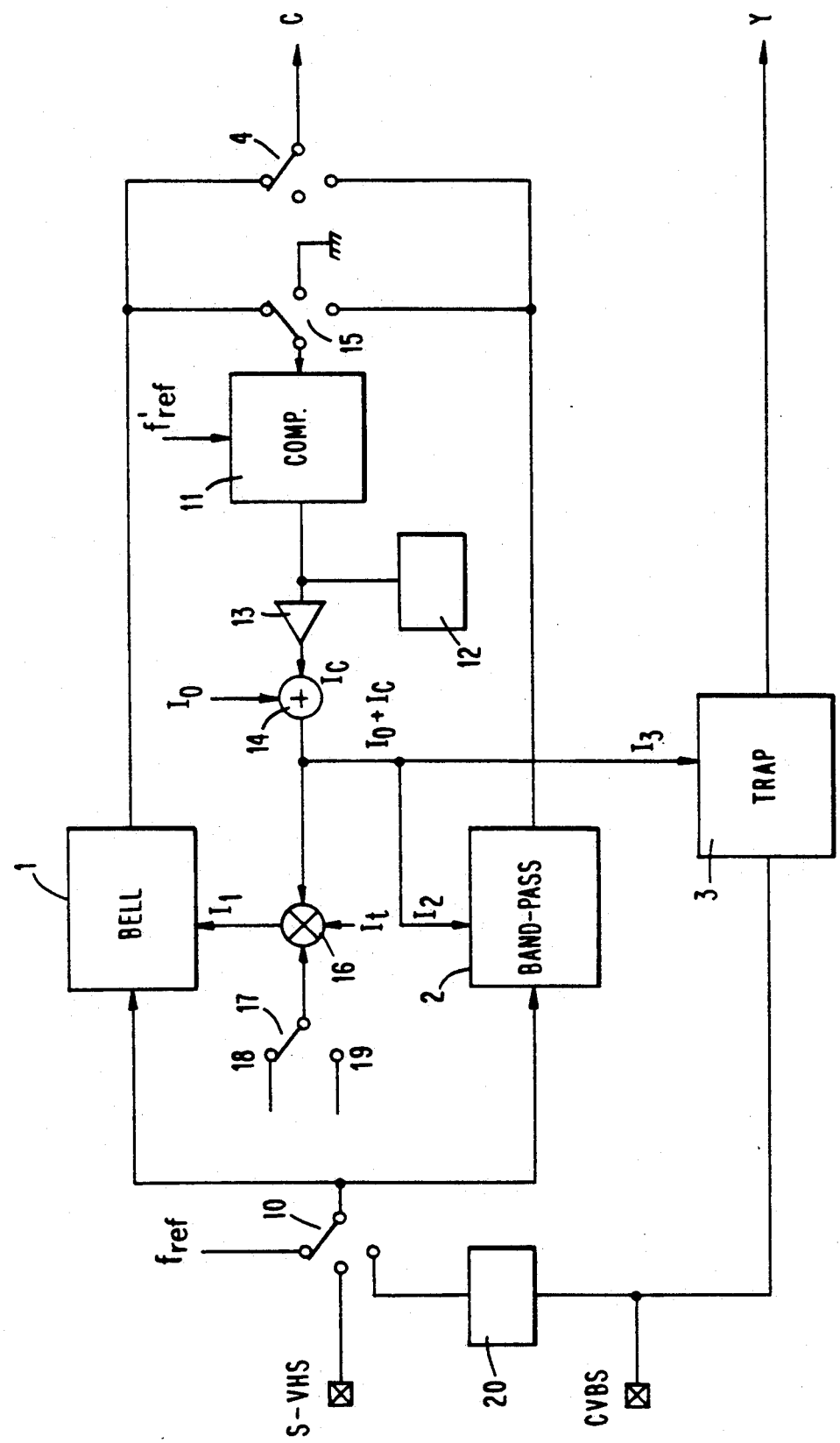

SYSTEM FOR ADJUSTING FILTERS PROCESSING THE COMPOSITE VIDEO SIGNAL IN A SECAM MULTISTANDARD SET

BACKGROUND OF THE INVENTION

The present invention relates to devices adapted to process multistandard TV signals such as color TV sets, video tape recorders, video cameras, transcoders, mixers, etc., and more particularly, to extraction and rejection filters for processing the composite video signal, in such devices and the adjustment of these filters.

Various TV systems use a signal commonly called composite video signal (CVBS) which comprises luminance information (Y) and chrominance information (C).

In order to extract the chrominance information, in the case of PAL and NTSC standards, a pass-band filter having an average quality factor (for example Q=3) is centered on the chrominance signal frequency which generally is 3.58 or 4.43 MHz. For SECAM standard, it is necessary to use a specific so-called bell filter, of high quality (for example Q=16) and centered on a frequency close to the reference frequency of the PAL standard, usually 4.286 MHz.

To supply the luminance signal, the composite video signal is filtered by a notch filter, usually called trap filter, centered on the frequency of the chrominance signal to eliminate the latter and to keep only the major part of the luminance signal.

Conventionally, each of these filters is achieved by using discrete components (inductors and capacitors) and these components have accurate values allowing to accurately adjust the frequency of each of these filters.

With the evolution of the technique, structures have been developed making it possible to achieve each of the above filters as integrated circuits without external discrete component. However, with integrated circuits, the central frequencies of the various filters may vary within a wide range, up to 30%. Therefore, it would be necessary to associate with each filter external adjustment means, which would substantially reduce the advantages of integration.

SUMMARY OF THE INVENTION

A specific object of the invention is to provide an assembly of filters for processing the composite video signal wherein all the filters are integrated and require none, or at the most one, external adjustment.

A general object of the invention is to provide a system for adjusting a filter processing the composite video signal wherein the filter is used without modification during adjustment phases.

To achieve its general object, the invention provides a system for adjusting a filter designed to filter the composite video signal in a multistandard set wherein means are provided for determining the tuning phases during the quiescent phases of the composite video signal; a reference signal is applied to the filter during the tuning phases; a phase-locked loop (PLL) supplies an error signal corresponding to the shifting of the filter; and means are provided to store the error signal of the loop.

To achieve its specific object, the invention provides a system for adjusting an assembly of filters designed to filter the composite video signal in a multistandard set, this assembly of filters particularly comprising a first filter or bell filter designed to extract the chrominance signal in SECAM standard, a second filter or pass-band filter designed to extract the chrominance signal in PAL or NTSC standard, and a third filter or trap filter designed to eliminate the chrominance signal. In this system, these filters are integrated, without discrete components, have a central frequency that can be set by a control signal, and their components determining their quiescent central frequencies are identical; means are provided for determining tuning phases during the quiescent phases of the TV signal; a reference signal is applied to the first or second filter during the tuning phases; a phase-locked loop supplies an error signal corresponding to the shifting of the filter; means are provided for storing the error signal of the phase-locked loop; and further means are provided for applying the stored signal to all filters of the filter unit.

According to an embodiment of the invention, the phase-locked loop compares, during the tuning phases, the output signal of the filter with a signal identical to the reference frequency but shifted in phase by 90°.

According to an embodiment of the invention, the control signal is applied to at least one of the filters through an operator which further receives a signal shifting the central frequency of the filter by a predetermined value.

According to an embodiment of the invention, switching means are provided to associate in a first step the phase-locked loop with the second filter and, in a second step, with the first filter.

According to an embodiment of the invention, the operator associated with the filter which serves as a basis for adjustment further receives a continuously varying signal that can be adjusted to a determined value.

According to an advantage of the invention, the automatic adjustment of one filter causes the adjustment of all other filters.

According to another advantage of the invention, providing first a frequency adjustment by the passband filter and then by the bell filter permits to more easily lock the adjustment, since the phase loop will be able to more easily lock from the signal supplied at the output of the pass-band filter, the quality of which is much lower than that of the bell filter. The bell filter will then serve to make an accurate adjustment once the preadjustment is completed.

BRIEF DESCRIPTION OF THE DRAWINGS

The foregoing and other objects, features and advantages of the invention will be apparent from the following detailed description of preferred embodiments as illustrated in the accompanying figure which shows a block diagram of a system according to the invention.

In the circuit shown in the figure, the composite video signal arrives at a terminal CVBS. The chrominance signal C is supplied to a first output terminal and the luminance signal Y is supplied to a second output terminal.

DETAILED DESCRIPTION OF THE INVENTION

To select the chrominance signal in the SECAM standard, the signal CVBS passes through a bell filter 1 and, in the NTSC or PAL standard, it passes through a pass-band filter 2. To provide the luminance signal Y, the signal CVBS passes through a filter eliminating the chrominance signal or trap filter 3. A multi-throw switch 4 connects the terminal C to the output of the bell filter 1 or to the output of the band-pass filter 2. This switch is conventionally controlled by a standard detecting circuit. Switch 4 can also be set to an intermediary quiescent state during the adjustment or tuning phases which are described later on.

According to a basic aspect of the invention, each filter 1, 2 and 3 is entirely integrated, without any external component. In addition, the integrated components determining the quiescent frequency of these three filters are identical. As a result, if because of technological variations these filters are not centered on the desired frequency, they will nevertheless have an equal quiescent frequency, that is, the same differance with respect to the desired frequency.

In addition, the central tuning frequency of the three filters 1, 2 and 3 can be adjusted by a control signal applied to their respective control input I1, I2 and I3. Thus, if a same control signal is applied to the three inputs I1, I2 and I3, the central frequencies of the three filters will be accordingly shifted.

The circuit shown comprises, at the common input of filters 1 and 2, a switch 10 connecting these inputs either, as described above, to the terminal CVBS, or, during the tuning phases, to a signal at a reference frequency $f_{ref}$. These tuning phases will correspond to phases during which there is no picture information, for example during the frame retraces. This reference frequency corresponds for example to the chrominance frequency in PAL or NTSC standard (4.43 or 3.58 MHz). The system further comprises a phase-locked loop including a phase comparator 11 receiving at a first input a signal $f'_{ref}$ having the same frequency as the reference frequency applied to the input of switch 10 but in quadrature. The output of the phase comparator 11 is stored in a circuit 12, for example a capacitor or a memory associated at the input with an analog/digital converter and at the output to a digital/analog converter. The content of this memory is applied by an adapter 13 supplying a current $I_c$ to a first input of an adder 14, the other input of which receives a reference signal $I_0$. The output of adder 14 is sent to the control inputs I1, I2 and I3 of filters 1, 2 and 3. The second input of the phase comparator 11 is connected to a switch 15, the second terminal of which can be connected either to a quiescent position outside the tuning phases, to the output of the band-pass filter, or to the output of the bell filter.

The figure further shows that the application of signal $I_0+I_c$ at the input I1 of the bell filter is achieved through an operating circuit such as a multiplier 16, the function of which will be described later on.

First, one considers a tuning phase during which the phase-locked loop is closed on the band-pass filter 2. In this configuration, switch 10 is connected to the reference frequency, switch 4 is in quiescent state and switch 15 is connected to the output of the band-pass filter. If the band-pass filter is perfectly tuned on the reference frequency $f_{ref}$, it supplies the non out of phase signal $f_{ref}$ and comparator 11, which receives two signals shifted in phase by 90° supplies a null output. If there is a difference between the central frequency of the band-pass filter and the reference frequency, comparator 11 supplies an error signal varying like the phase-shift introduced by the filter, that is, an error signal which depends upon the difference between the effective central frequency of the filter and the reference frequency. This error signal is stored in a circuit 12 and transformed into current by adapter 13 for supplying a correcting current $I_c$ so that the current $I_0+I_c$ controls filters 1, 2 and 3 in order to realign them.

In fact, the described servo-loop has a low sensitivity close to the optimum adjustment since the band-pass filter 2 is a low quality filter. Thus, preferably, if a very accurate adjustment is desired, once the above preadjustment is completed, switch 15 is switched to the output of the bell filter 1. Because of the high quality of the latter, a small difference between the central frequency of the filter and the reference frequency will cause a substantial phase-shift and will allow to adjust the correcting signal $I_c$. This two-step adjustment is desirable because, in case the bell filter is directly used, this might not cause the servo-control to converge if the initial difference between the reference frequency and the quiescent frequency of the filters is too high.

In the above, it is assumed that the three filters, which have an equal quiescent frequency since they are identically manufactured, have to be adjusted to the same central frequency when operating. This is not often the case in practice because, for example, for the PAL standard the tuning frequency is 4.43 MHz while in SECAM standard, the central frequency of the bell filter has to be 4.286 MHz. Thus, it will be provided that, once the servo-control is achieved and the correcting value is stored in memory 12, a switch 17 is switched to a terminal 18 to apply an adjustment signal to multiplier 16. This adjustment signal, applied outside the tuning phases, does not modify the current $I_c$ and the adjustment of filters 2 and 3 but allows to center the bell filter on a desired value. The low terminal 19 of switch 17 corresponds to a neutral terminal. If it is desired, a similar adjustment can be provided for the band-pass or trap filter.

The above described adjustment system is usually sufficient in itself. However, it may be desirable to carry out additional adjustment allowing for eventual errors due to some components of the circuitry.

To achieve this purpose, an additional input $I_t$ is provided on multiplier 16. Once the adjusting is achieved as above described, the output signals are measured, for example at the output of the trap filter, and if they are not satisfactory, a current is applied to the input $I_t$ of multiplier 16 during the tuning phases. This modifies the current Ic and all the tuning frequencies of the filters. However, if $I_t$ is acted upon outside of the adjustment periods, the tuning frequency of the bell filter can be modified without changing the tuning frequencies of the band-pass filter and trap filter. The application of signal $I_t$ can depend upon external potentiometers or an external analog control. It may also depend upon the control signals transiting on the bus generally provided in a TV set.

A preferred embodiment of the invention has been disclosed above. Those skilled in the art will be able to bring various variants, especially to adapt it to specific TV standards.

For example, in the so-called SVHS transmission standard, there is a chrominance signal input without a luminance signal. This input is shown on the terminal S-VHS of FIG. 1. In that case, during the operation phases of the filters, switch 10 will be connected to this terminal S-VHS.

On the other hand, conventionally, terminal CVBS is directly connected to the input of the trap filter but is connected to switch 10 through a prefiltering filter 20 designed to decrease on the input of filters 1 and 2 the low frequency components of the luminance signal, which simplifies manufacturing of these filters.

Examples of the numerous types of filters that can be used are the filters described by Yoshio Ishigaki et al. on Jun. 9, 1983 at the IEEE International Conference on Consumer Electronics (published in No. 4, Vol. CE 29, Nov. 1983, pages 475-485 of IEEE Transactions on Consumer Electronics).

I claim:

1. A system for adjusting a filter processing a composite video signal in a multistandard set, comprising:
   means for determining phases for tuning the filter during quiescent phases of the composite video signal;
   means for applying a reference signal to the filter during the tuning phases;
   a phase-locked loop responsive to the reference signal for forming an error signal corresponding to deviation of an output signal of the filter from the reference signal;
   means for storing the error signal of the phase-locked loop; and
   means responsive to the error signal for adjusting the filter.

2. A system according to claim 1, wherein the phase-locked loop compares, during the tuning phases, the output signal of the filter to a signal identical to the reference signal but 90° shifted.

3. A system according to claim 1, wherein a control signal is applied to the filter through an operator which further receives a signal for shifting the central frequency of the filter by a predetermined value.

4. A system for adjusting an assembly of filters designed to filter the composite video signal including a chrominance signal in a multistandard set, comprising:
   a first filter or bell filter designed to extract the chrominance signal in the SECAM standard,
   a second filter or band-pass filter designed to extract the chrominance signal in PAL or NTSC standard,
   a third filter or trap filter designed to eliminate the chrominance signal,
   these filters being integrated, without discrete components, and having a central frequency to be adjusted by a control signal, and their components fixing their central quiescent frequencies being identical;
   means for determining phases for tuning the filters during the quiescent phases of the TV signal;
   means for applying a reference signal to the first and second filters during the tuning phases;
   a phase-locked loop responsive to the reference signal for forming an error signal corresponding to deviation of a central frequency of the filter from a frequency of the reference signal;
   means for storing the error signal of the phase-locked loop; and
   means for applying the stored signal to all the filters of the filter assembly to adjust the assembly.

5. A system according to claim 4, wherein the phase-locked loop compares, during the tuning phases, the filter output signal to a signal identical to the reference signal but 90° phase-shifted.

6. A system according to claim 4, wherein the control signal is applied to at least one of the filters through an operator which further receives a signal shifting the central frequency by a predetermined value.

7. A system according to claim 4, wherein the switching means are provided for associating in a first step the phase-locked loop to the second filter and, in a second step, to the first filter.

8. A system according to claim 7, wherein the operator associated with the filter serving as a basis for the adjustment further receives a signal that continuously varies and can be set to a determined value.

9. A system for adjusting a filter for processing a composite signal, comprising:
   a circuit for determining a period for adjustment during a predetermined interval of the composite signal,
   a reference circuit for supplying said filter with a reference signal during said period for adjustment,
   an error generator responsive to the reference signal for forming an error signal corresponding to a deviation of an output signal of the filter, and
   an adjusting circuit responsive to the error signal for adjusting the filter,
   said composite signal comprising a composite video signal having a plurality of components and said filter comprising a plurality of filtering circuits for processing said components,
   said plurality of filtering circuits comprising a first filtering circuit for adapting said composite signal for SECAM standard and a second filtering circuit for adapting said composite signal for PAL and NTSC standard.

10. The system according to claim 9, wherein said composite signal comprises a chrominance component and said first and second filtering circuits pass the chrominance component.

11. The system according to claim 10, wherein said plurality of filtering circuits comprises a third filtering circuit for eliminating the chrominance component from the composite signal.

12. The system according to claim 11, wherein said adjusting circuit adjusts each of said first, second and third filtering circuits.

13. The system according to claim 9, wherein said predetermined interval comprises a quiescent period of said composite video signal.

14. A method for adjusting a filter for processing a composite video signal comprising the steps of:
   determining a period for adjustment during a predetermined interval of the composite video signal,
   supplying the filter with a reference signal during said period for adjustment,
   forming an error signal corresponding to a deviation of output signals of the filter using the reference signal, and
   adjusting the filter in response to the error signal, wherein
   said step of determining comprises determining the period for adjustment during a quiescent period of the composite video signal, and
   said step of adjusting comprises adjusting each of a plurality of filtering stages of the filter, said filtering stages adapting the composite signal to SECAM, PAL and NTSC standards.

15. The method according to claim 14, wherein said step of forming an error signal comprises shifting the reference signal in phase to generate a shifted reference signal and comparing the shifted reference signal with output signals of said filtering stages.

* * * * *